US012465985B2

(12) United States Patent
Feng et al.

(10) Patent No.: US 12,465,985 B2
(45) Date of Patent: Nov. 11, 2025

(54) SAW BLADE QUICK-CHANGE STRUCTURE FOR ELECTRIC TOOLS, AND SAW BLADE QUICK-CHANGE METHOD

(71) Applicant: ZHEJIANG JINMEI ELECTRIC TOOLS CO., LTD., Zhejiang (CN)

(72) Inventors: Zhiming Feng, Jinhua (CN); Jinyun Gao, Jinhua (CN)

(73) Assignee: ZHEJIANG JINMEI ELECTRIC TOOLS CO., LTD., Jinhua (CN)

( * ) Notice: Subject to any disclaimer, the term of this patent is extended or adjusted under 35 U.S.C. 154(b) by 0 days.

(21) Appl. No.: 18/273,724

(22) PCT Filed: Apr. 20, 2022

(86) PCT No.: PCT/CN2022/087810
§ 371 (c)(1),
(2) Date: Jul. 21, 2023

(87) PCT Pub. No.: WO2023/087615
PCT Pub. Date: May 25, 2023

(65) Prior Publication Data
US 2024/0082932 A1 Mar. 14, 2024

(30) Foreign Application Priority Data
Nov. 17, 2021 (CN) .......................... 202111362775.X

(51) Int. Cl.
B23D 61/00 (2006.01)
(52) U.S. Cl.
CPC .................................. B23D 61/00 (2013.01)

(58) Field of Classification Search
CPC ........... B23D 61/00; B23D 61/10; B27F 5/02; B27B 19/006; B27B 5/32; B24B 23/022;
(Continued)

(56) References Cited

U.S. PATENT DOCUMENTS 6,569,001 B2 * 5/2003 Rudolf .................... B24B 23/02
451/523
8,960,688 B2 * 2/2015 Zhou ..................... B24B 23/022
451/356
(Continued)

FOREIGN PATENT DOCUMENTS

CN 105728846 7/2016
CN 207239310 4/2018
(Continued)

Primary Examiner — Ghassem Alie
(74) Attorney, Agent, or Firm — Jiwen Chen; JOYWIN IP LAW PLLC

(57) ABSTRACT

Disclosed are a saw blade quick-change structure for electric tools, and a saw blade quick-change method. The saw blade quick-change structure for electric tools comprises a locking mechanism, a head shell, a tool rest and a quick-change buckle. The locking mechanism is installed in the head shell. The tool rest is installed at the bottom of the head shell. The quick-change buckle is hinged to the head shell. The locking mechanism comprises a movable rod, a locking rod, a collet chuck, a locking block, a stop collar and a return spring. The collet chuck is located below the movable rod. The locking rod is clamped by the collet chuck. The locking block and the stop collar open or close the collar chuck. The return device returns the locking block. The saw blade is assembled and disassembled through the cooperation of the collet chuck and the locking block.

10 Claims, 4 Drawing Sheets

(58) Field of Classification Search
CPC .............. B24B 45/006; Y10T 83/7045; Y10T
83/9457; Y10T 279/132; Y10T 279/32
USPC ....... 83/698.11, 782, 597, 697; 30/330, 339,
30/331; 451/356, 357, 359; 279/141
See application file for complete search history.

(56) References Cited

U.S. PATENT DOCUMENTS

| | | | |
|---|---|---|---|
| 9,486,909 B2* | 11/2016 | Zieger | ........................ B27B 5/32 |
| 10,906,153 B2* | 2/2021 | Aoki | .......................... B25F 3/00 |
| 11,207,742 B2* | 12/2021 | Gao | ........................ B23D 61/00 |
| 2007/0060030 A1* | 3/2007 | Pollak | ....................... B27B 5/32 |
| | | | 451/359 |
| 2010/0000100 A1 | 1/2010 | Saegesser | |
| 2010/0197208 A1* | 8/2010 | Blickle | ................. B24B 45/006 |
| | | | 451/344 |

FOREIGN PATENT DOCUMENTS

| | | | | |
|---|---|---|---|---|
| CN | 208341903 | | 1/2019 | |
| CN | 208696453 | | 4/2019 | |
| CN | 208696453 U | * | 4/2019 | ............. B23D 61/00 |

\* cited by examiner

SAW BLADE QUICK-CHANGE STRUCTURE FOR ELECTRIC TOOLS, AND SAW BLADE QUICK-CHANGE METHOD

This is a U.S. national stage application of PCT Application No. PCT/CN2022/087810 under 35 U.S.C. 371, filed Apr. 20, 2022 in Chinese, claiming priority of Chinese Application No. 202111362775.X, filed Nov. 17, 2021, all of which are hereby incorporated by reference.

BACKGROUND OF THE INVENTION

1. Technical Field

The present invention relates to the technical field of machining equipment, in particular to a saw blade quick-change structure for electric tools, and a saw blade quick-change method.

2. Description of Related Art

Most multi-use saw blades on the market are fixed and installed through a pressing plate and inner hexagon screws, and are assembled and disassembled through a hexagon wrench, which is strenuous and time-consuming during use. Some saw blade quick-change structures on the market can save time and labor, but all these saw blade quick-change structures are only suitable for special saw blades, and cannot be used for installing all multi-use blades.

For example, Chinese Invention Patent CN105728846B discloses a quick-change multi-use saw structure which comprises a quick-change device, wherein the quick-change device comprises a quick-change trigger snap, an eccentric block, a movable rod, a collet chuck, a swelling rod and a compression spring, the quick-change trigger snap and the eccentric block are connected to the top of a head shell through a cylindrical pin, the movable rod is disposed in an output shaft, the top of the movable rod is closely connected to the eccentric block, the bottom of the movable rod is connected to the swelling rod in a threaded manner, the swelling rod is sleeved with the collet chuck, the collet chuck is sleeved with the compression spring, a tool rest is disposed at the bottom of the output shaft, an inward slope is disposed on the inner wall of the tool rest from top to bottom, and a lug corresponding to the slope is disposed on the outer surface of the collet chuck. According to the quick-change multi-use saw structure, the diameter of the collet chuck can be changed only by pulling the quick-change trigger snap, and then the saw blade can be detached and changed. The saw blade is fixed and installed by clamping the collet chuck in an inner hole of the saw blade; when the diameter of the inner hole of the saw blade is too large, the saw blade cannot be installed or cannot be fixed after being installed; and when the diameter of the inner hole of the saw blade is too small, the collet chuck cannot be installed. The quick-change multi-use saw structure is only suitable for saw blades with an inner hole of a specific diameter, and saw blades with an inner hole of a diameter greater than or less than this specific diameter cannot be assembled smoothly, so the quick-change multi-use saw structure has limitations in use.

SUMMARY OF THE INVENTION

The present invention provides a saw blade quick-change structure for electric tools to solve the problems that, in the prior art, the saw blade change process is complex and existing quick-change heads are only suitable for installing specific saw blades.

The technical solution provided by the present invention to solve the aforementioned problems is as follows:

The present invention is a saw blade quick-change structure for electric tools, which comprises a locking mechanism, a head shell, a tool rest and a quick-change buckle, wherein the locking mechanism is installed in the head shell and used for fixing or releasing a saw blade, the tool rest is installed at a bottom of the head shell, and the quick-change buckle is hinged to the head shell and used for controlling the locking mechanism to lock or release the saw blade; the locking mechanism comprises a movable rod, a locking rod, a collet chuck, a locking block, a stop collar and a return spring; a cross-section of the movable rod is in an inverted Y shape, a cavity for receiving the collet chuck is formed in a lower portion of the movable rod, an upper portion of the collet chuck is located in the cavity, a clamping portion of the collet chuck faces downwards, an inner diameter of a lower portion of the cavity increases gradually from top to bottom, an upper surface of the collet chuck does not contact a top surface of the cavity, a locking head is disposed above the locking rod, a maximum diameter of the locking head is greater than a diameter of the locking rod below the locking head, and the locking head is located in the clamping portion of the collet chuck and is in contact with the clamping portion of the collet chuck; the locking block is located below the movable rod, a through hole is formed in a middle of the locking block, the locking block has an upper portion with a large inner diameter and a lower portion with a small inner diameter, a inclined slope is formed between the upper portion with the large inner diameter and the lower portion with the small inner diameter of the locking block, an outer side of the clamping portion of the collet chuck is in close contact with the inclined slope, and a central axis of the locking block is coaxial with a central axis of the movable rod; the stop collar is disposed around the locking rod, a position of an upper end of the stop collar corresponds to a position of a lower end of the clamping portion of the collet chuck in an up-down direction; and the return spring is in contact with the locking block and is used for returning the locking block.

Preferably, the return spring is a cylindrical spring, the outer diameter of the upper part of the locking block is larger than the outer diameter of the lower part, and the cylindrical spring is sleeved on the locking block and around the lower part of the block, and the top of the cylindrical spring abuts against the bottom surface of the upper part of the locking block, and the lower end of the cylindrical spring is fixed in the head shell. The large and small outer diameters are set on the locking block to realize the positioning of the cylindrical spring, so that the cylindrical spring can move stably in the device.

Preferably, the quick-change buckle comprises a quick-change trigger snap and an eccentric block, the quick-change trigger snap and the eccentric block are fixedly installed, and the eccentric block is hinged to the head shell and has a large-diameter portion and a small-diameter portion, as well as the small-diameter portion or the large-diameter portion in contact with an upper surface of the movable rod. The rotation axis of the eccentric block is fixed, and the eccentric block can be rotated to change the position of the large-diameter portion or the small-diameter portion so as to squeeze the movable rod downwards or release the movable rod.

Preferably, the saw blade quick-change structure for electric tools further comprises an output shaft and a shift fork, wherein the output shaft is a hollow stepped shaft, the locking mechanism is installed inside the output shaft, the output shaft is rotatably installed in the head shell, the output shaft and the head shell are connected through a bearing, and the tool rest is fixedly installed at a lower end of the output shaft; and the shift fork is disposed around the output shaft. The shift fork swings to drive the output shaft to rotate, so as to drive the saw blade to rotate and swing.

Preferably, the locking rod comprises a rod body and a rod head, the locking head is located at a top end of the rod body, and the rod head is matched with the tool rest to fix the saw blade.

Preferably, the locking rod penetrates through the tool rest, a hole or protrusion matched with the saw blade is disposed on a lower surface of the tool rest, the saw blade is disposed around the locking rod and is located between the tool rest and the rod head, and an upper surface of the rod head is in close contact with a lower surface of the saw blade.

Preferably, an inner diameter of a lower portion of the cavity in the lower end of the movable rod is the same as that of a hole in an upper portion of the locking rod. The cavity of the movable rod in the inverted Y-shaped is matched with the interior of the locking block to form a space for releasing the clamping portion of the collet chuck.

Preferably, a deep groove ball bearing is disposed on an upper portion of the output shaft, and a needle bearing is disposed on a lower portion of the output shaft; and a first clamp spring is disposed on an upper portion of the deep groove ball bearing, and a second clamp spring is disposed on a lower portion of the deep groove ball bearing. The deep groove ball bearing and the needle bearing are arranged to reduce the frictional force during rotation, and the clamp springs are arranged to prevent the bearing from moving in an axial direction.

A saw blade quick-change method using the saw blade quick-change structure for electric tools comprises the following steps:
S1: rotating the quick-change buckle to move the movable rod downward and press the locking block, so that the locking block moving downward to drive the collet chuck to move downward, then the collet chuck touching the limit sleeve and stopping moving downward, the movable rod and the locking block continuing to move down so that a clamping part of the collet chuck being located in a cavity formed by a lower part of the movable rod and an upper part of the locking block, and pulling the locking rod out from the head shell, and the clamping part of the collet chuck being elastically stretched out or expanded to release the locking head and then reset;
S2: detaching the saw blade disposed around the locking rod, and replacing the saw blade with a new saw blade; and
S3: inserting the locking rod in the head shell, the locking head entering the clamping part of the collet chuck, rotating the quick-change buckle, the return spring restoring the locking block, and the locking block moving upward so that a slope in the locking block compressing inwardly the clamping part of the collet chuck to make the collet chuck hug the locking head and fix the locking rod, so as to complete the quick change installation of the saw blade.

Preferably,
Step S1 specifically comprises: with the cylindrical pin as a rotation center, driving, by the quick-change trigger snap, the eccentric block with the small-diameter portion abutting against the movable rod to rotate by 180° to enable the large-diameter portion of the eccentric block to abut against the movable rod; and pressing the movable rod downwards to drive the collet chuck and the locking block to move downwards until the lower end of the collet chuck contacts the upper end of the stop collar, such that the collet chuck stops moving downwards, the locking block continues to move downwards under the action of the movable rod until the collet chuck is located at a center of an internal space defined by the movable rod and the locking block, at this moment, the collet chuck is in a free state, and the locking rod is taken out;
Step S2 specifically comprises: taking out the locking rod sleeved with the original saw blade, detaching the saw blade from the locking rod, and disposing the new saw blade around the locking rod;
Step S3 specifically comprises: inserting the locking rod sleeved with the new saw blade inserted into the hole of the tool rest until the locking head of the locking rod is clamped into the collet chuck, such that the locking rod is fixed preliminarily; then, rotating the quick-change trigger snap with the large-diameter portion abutting against the movable rod to an initial state in which the small-diameter portion of the quick-change trigger snap abuts against the movable rod; and at this moment, releasing the cylindrical spring is released to allow the locking block to move upwards to drive the collet chuck to move upwards, which in turn drives the locking head to move upwards to enable the rod head press the rod head on the tool rest, such that the locking rod moves upwards to the maximum extent and will no longer move upwards, the inclined slope on the inner side of the locking block, which is still subjected to an upward force from the cylindrical spring, presses the outer side of the clamping portion of the collet chuck to enable the collet chuck to contract inwards to fasten the locking rod, and quick change of the saw blade is completed.

By adoption of the technical solution, compared with the prior art, the present invention has the following beneficial effects:

1. The saw blade quick change structure of the electric tool involved in the present invention locks or loosens the saw blade through a locking mechanism. The locking mechanism includes a movable rod, a locking rod, a collet chuck, a locking block, a limit sleeve/stop collar and a return spring. When locking, the locking head on the locking rod is located in the clamping part of the collet chuck, the inclined surface in the locking block contacts the outside of the clamping part of the collet chuck, and the locking block produces an upward movement tendency by the elastic force of the return spring, so the inclined surface in the locking block has an upward movement tendency to press the clamping part of the collet chuck so that it cannot be opened and generate an inward force to hold the locking head to complete the fixing of the locking rod. When the saw blade needs to be replaced, a user can rotate the quick-change trigger snap to move the movable rod downward, and the downward movement of the movable rod drives the locking block to move downward, and the collet chuck moves downward together with the locking block. When the collet chuck and the limit sleeve stop the movement when the sleeve contacts, the locking block continues to move downward to release the collet chuck, and the clamping part of the collet chuck is located in the cavity with a large inner diameter formed by the upper part of the locking block and the lower part of the movable rod, the collet chuck can be opened freely here, then take out the locking rod and replace the saw blade and then put it back so that the locking head is stuck in the collet chuck, and then rotate the quick-change trigger snap, the return spring pushes the movable rod, locking block and the collet chuck and the locking mechanism return to the locked state. The present invention is ingeniously designed, and the operation of replacing the saw blade is fast and simple.

2. The key part of the present invention, the spring collet chuck, is an easily available part on the market, and does not require custom processing, which saves the cost required for the production and manufacture of the present invention.

3. The locking mechanism in the present invention has a reasonable design and an ingenious structure. The components in the locking mechanism are compact in structure and closely matched, making full use of the space inside the head shell, so that it can firmly lock/release the saw blade without bloated, saving space resources.

4. According to the saw blade quick-change structure for electric tools, the saw blade is pressed on the tool rest to be fixed through the rod head on the lower portion of the locking rod, the diameter of the rod head is greater than that of the inner hole of most saw blades on the market, and the diameter of the locking rod is less than that of the inner hole of most saw blades on the market, such that the saw blade quick-change structure and method have good adaptability and can be used for installing most saw blades on the market, and special saw blades are not needed; and the saw blade quick-change structure for electric tools can also be used for installing shovel blades, grinding wheels, or other components.

Reference signs: 1, quick-change trigger snap; 2, eccentric block; 3, first clamp spring; 4, cylindrical pin; 5, head shell; 6, deep groove ball bearing; 7, second clamp spring; 8, shift fork; 9, needle bearing; 10, output shaft; 11, movable rod; 111, cavity; 12, collet chuck; 13, locking block; 131, inclined slope; 14, cylindrical spring; 15, stop collar; 16, tool rest; 17, sealing ring; 18, locking rod; 181, rod body; 182, locking head; 183, rod head; 19, saw blade.

DETAILED DESCRIPTION OF THE INVENTION

To gain a further understanding of the contents of the invention, the present invention will be described in detail below in conjunction with embodiments. The following embodiments are used to explain the present invention rather, and are not intended to limit the scope of the invention.

Figure 1:
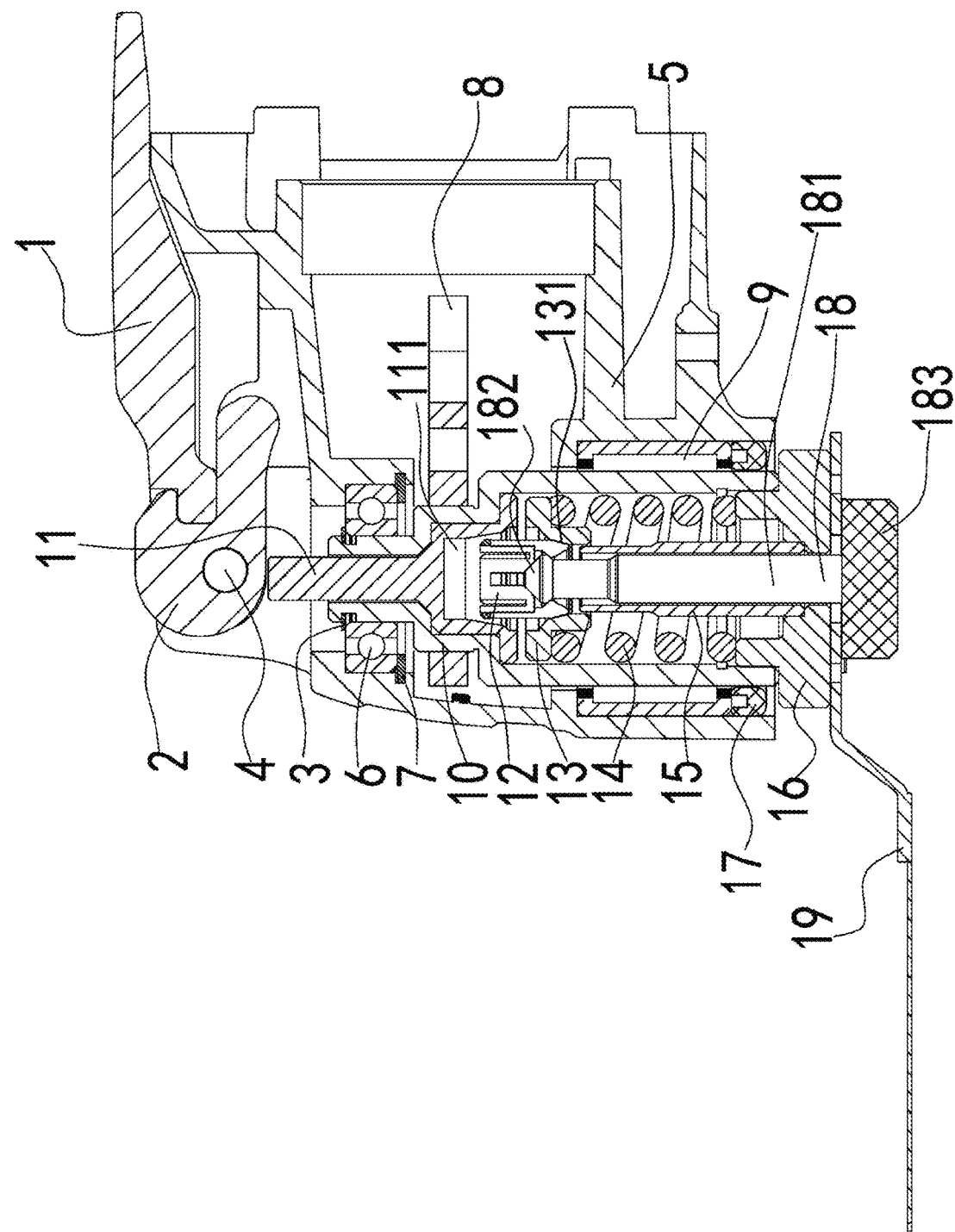
FIG. 1 is a structural diagram of a saw blade quick-change structure for electric tools in a clamped state according to the invention.
Figure 3:
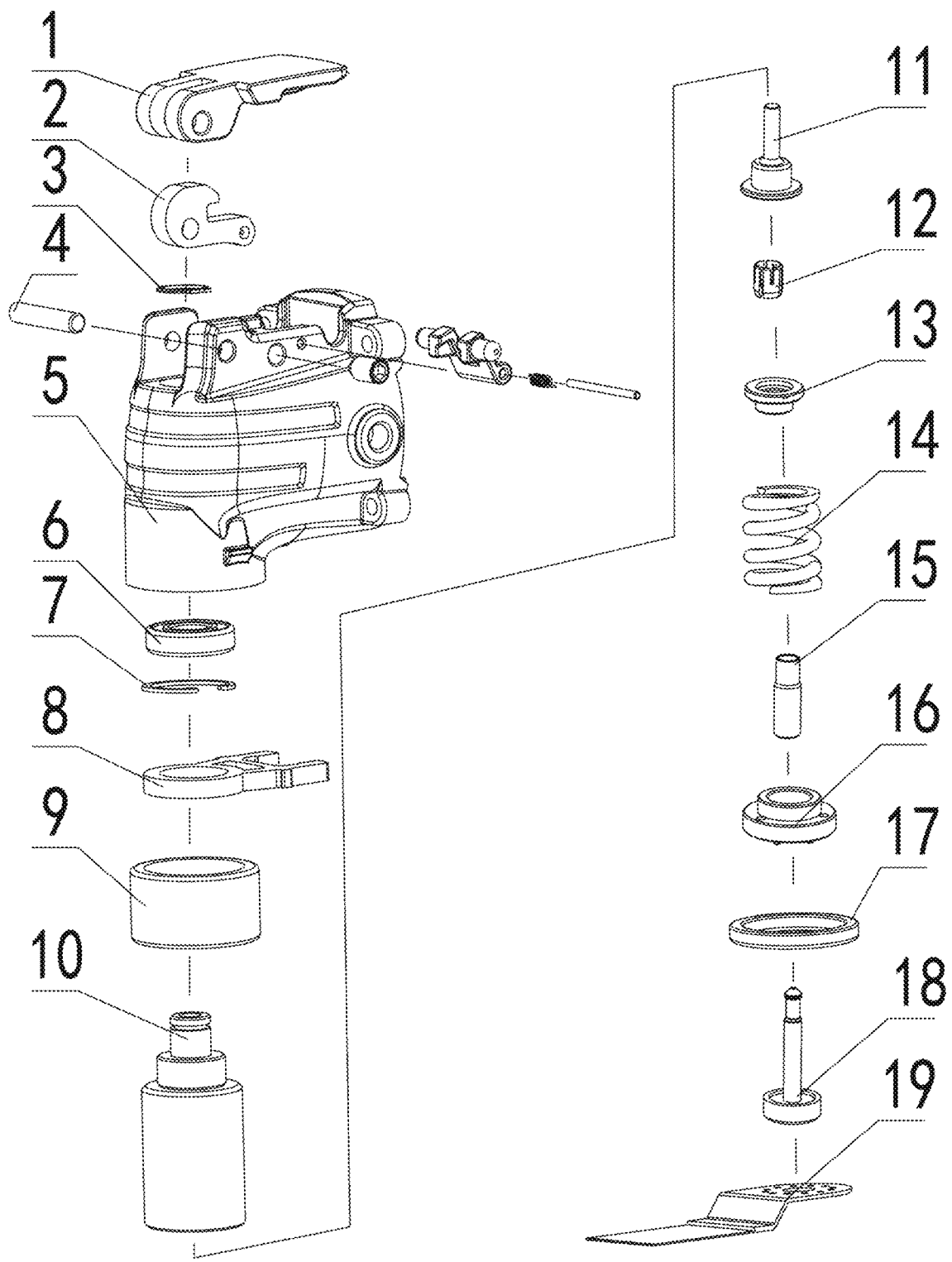
FIG. 3 is an exploded view of the saw blade quick-change structure for electric tools according to the invention.

Referring to FIG. 1 and FIG. 3, the present invention relates to a saw blade quick-change structure for electric tools, which comprises a locking mechanism, a head shell 5, a tool rest 16 and a quick-change buckle, wherein the locking mechanism is installed in the head shell 5 and is used for fixing or releasing a saw blade 19, the tool rest 16 is installed at the bottom of the head shell 5, the quick-change buckle is hinged to the head shell 5 and is used for controlling the locking mechanism to lock or release the saw blade 16, and the locking mechanism comprises a movable rod 11, a locking rod 18, a collet chuck 12, a locking block 13, a stop collar 15 and a return spring; the cross-section of the movable rod 11 is in an inverted Y shape, a cavity 111 for receiving the collet chuck 12 is formed in a lower portion of the movable rod 11, an upper portion of the collet chuck 12 is located in the cavity 111, a clamping portion of the collet chuck 12 faces downwards, the inner diameter of a lower portion of the cavity 111 increases gradually from top to bottom, an upper surface of the collet chuck 12 does not contact a top surface of the cavity 111, a locking head 182 is disposed above the locking rod 18, the maximum diameter of the locking head 182 is greater than the diameter of the locking rod 18 below the locking head 182, and the locking head 182 is located in the clamping portion of the collet chuck 12 and is in contact with the clamping portion of the collet chuck 12; the locking block 13 is located below the movable rod 11, a through hole is formed in the middle of the locking block 13, the locking block 13 has an upper portion with a large inner diameter and a lower portion with a small inner diameter, a inclined slope 131 is formed between the upper portion with the large inner diameter and the lower portion with the small inner diameter of the locking block 13, an outer side of the clamping portion of the collet chuck 12 is in close contact with the inclined slope 131, and the central axis of the locking block 13 is coaxial with the central axis of the movable rod 11; the stop collar 15 is disposed around the locking rod 18, the position of an upper end of the stop collar 15 corresponds to the position of a lower end of the clamping portion of the collet chuck 12 in an up-down direction, an upper surface of the stop collar 15 does not contact the collet chuck 12, and a lower end of the stop collar 15 is fixed; and the return spring is in contact with the locking block 13 and is used for returning the locking block 13. A sealing ring 17 is provided below the needle bearing in the present embodiment.

Referring to FIG. 1 and FIG. 3, the return spring is a cylindrical spring 14, the outer diameter of the upper part of the locking block 13 is larger than the outer diameter of the lower part, and the cylindrical spring 14 is sleeved around the lower part of the locking block 13, and the top of the cylindrical spring abuts against the bottom surface of the upper part of the locking block, and the lower end of the cylindrical spring is fixed in the head shell. This design realizes the positioning of the cylindrical spring 14 and makes the movement of the cylindrical spring 14 stable in the device. The quick-change buckle comprises a quick-change trigger snap 1 and an eccentric block 2, wherein the quick-change trigger snap 1 and the eccentric block 2 are fixedly installed, and the eccentric block 2 is hinged to the head shell 5 and has a large-diameter portion, as well as a small-diameter portion in contact with an upper surface of the movable rod 11. The rotation axis of the eccentric block 2 is fixed, and the eccentric block can be rotated to change the position of the large-diameter portion or the small-diameter portion so as to squeeze the movable rod 11 downwards or release the movable rod 11. In this embodiment, the saw blade quick-change structure further comprises an output shaft 10 and a shift fork 8, wherein the output shaft 10 is a hollow stepped shaft, the locking mechanism is installed inside the output shaft 10, the output shaft 10 is rotatably installed in the head shell 5, the output shaft 10 and the head shell are connected through a bearing, and the tool rest 16 is fixedly installed at a lower end of the output shaft 10; and the shift fork 8 is disposed around the output shaft 10. The shift fork 8 swings to drive the output shaft 10 to rotate, so as to drive the saw blade 19 to rotate and swing.

Referring to FIG. 1 and FIG. 3, the locking rod 18 comprises a rod body 181 and a rod head 183, the locking head 182 is located at a top end of the rod body 181, and the rod head 183 is matched with the tool rest 16 to fix the saw blade 19. The locking rod 18 penetrates through the tool rest 16, a hole or protrusion matched with the saw blade 19 is disposed on a lower surface of the tool rest 16, the saw blade 19 is disposed around the locking rod 18 and is located between the tool rest 16 and the rod head 183, and an upper surface of the rod head 183 is in close contact with a lower surface of the saw blade 19. The inner diameter of a lower portion of the cavity 111 in the lower end of the movable rod 11 is the same as that of a hole in an upper portion of the locking rod 13. The cavity 111 of the movable rod 11 in the inverted Y-shaped is matched with the interior of the locking block 13 to form a space for releasing the clamping portion of the collet chuck 12. A deep groove ball bearing 6 is disposed on an upper portion of the output shaft 10, and a needle bearing 9 is disposed on a lower portion of the output shaft 10; and a first clamp spring 3 is disposed on an upper portion of the deep groove ball bearing 6, and a second clamp spring 7 is disposed on a lower portion of the deep groove ball bearing 6. The deep groove ball bearing 6 and the needle bearing 9 are arranged to reduce the frictional force during rotation, and the clamp springs are arranged to prevent the bearing from moving in an axial direction.

Figure 2:
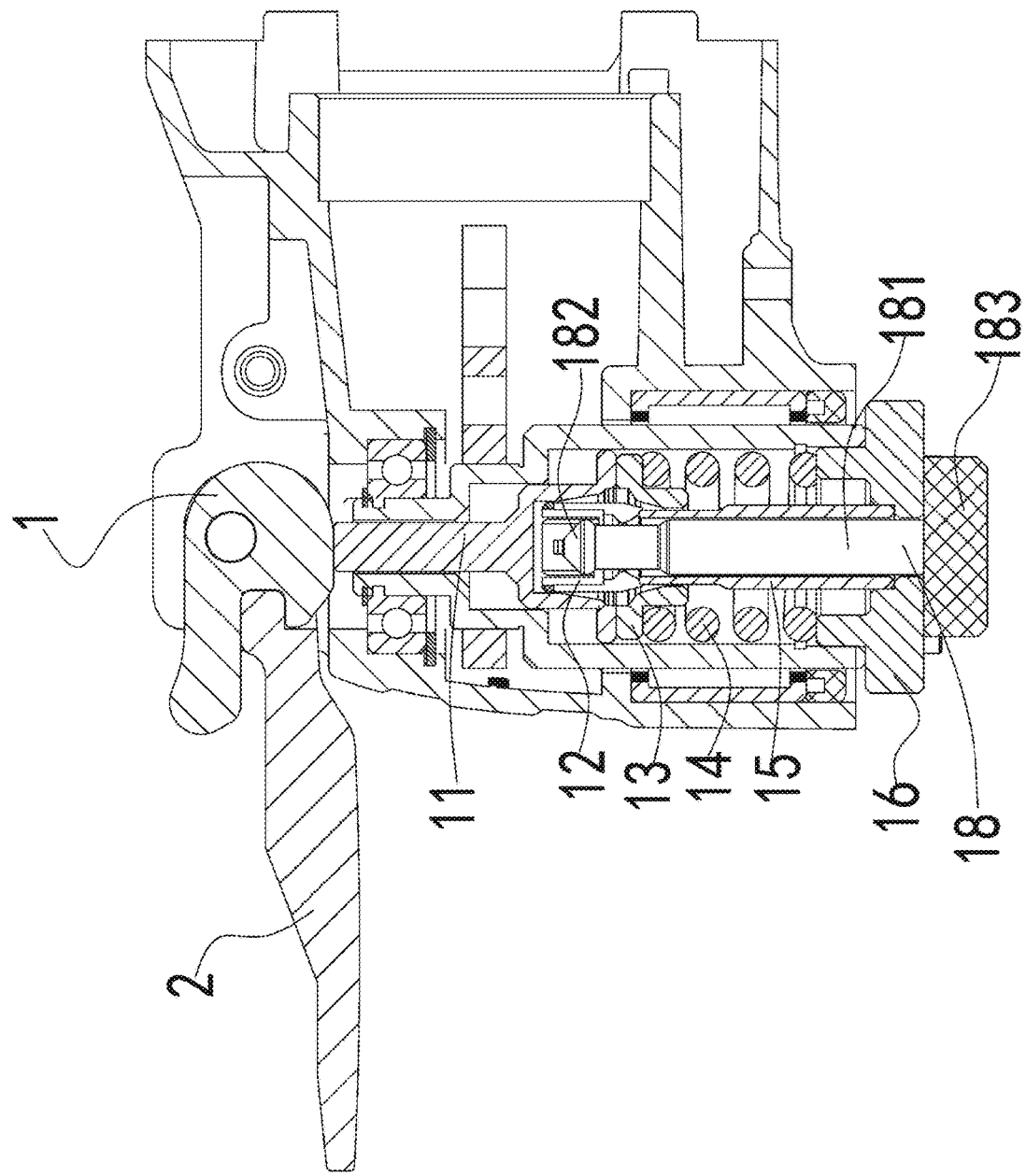
FIG. 2 is a structural diagram of the saw blade quick-change structure for electric tools in a released state according to the invention.

The present invention further relates to a saw blade quick-change method for electric tools, which uses the saw blade quick-change structure for electric tools and comprises the following steps:

S1: the quick-change buckle is rotated to release the locking mechanism, and the locking rod 18 is taken out of the head shell 5;

Referring to FIG. 1, with the cylindrical pin 4 as a rotation center, the eccentric block 2 with the small-diameter portion abutting against the movable rod 11 is driven by the quick-change trigger snap 1 to rotate by about 180° to enable the large-diameter portion of the eccentric block 2 to abut against the movable rod 11, the movable rod 11 is pressed downwards to drive the collet chuck 12 and the locking block 13 to move downwards by a certain distance, the collet chuck 12 stops moving downwards when the lower end of the collet chuck 12 contacts the upper end of the stop collar 15, the locking block 13 continues to move downwards under the action of the movable rod 11 until the collet chuck 12 is located at the center of an internal space defined by the movable rod 11 and the locking block 13, at this moment, the collet chuck 12 is in a free state, as shown in FIG. 2 (the saw blade has been removed in FIG. 2), the clamping portion of the collet chuck 12 can be opened freely, and the locking rod 18 is taken out.

Figure 4:
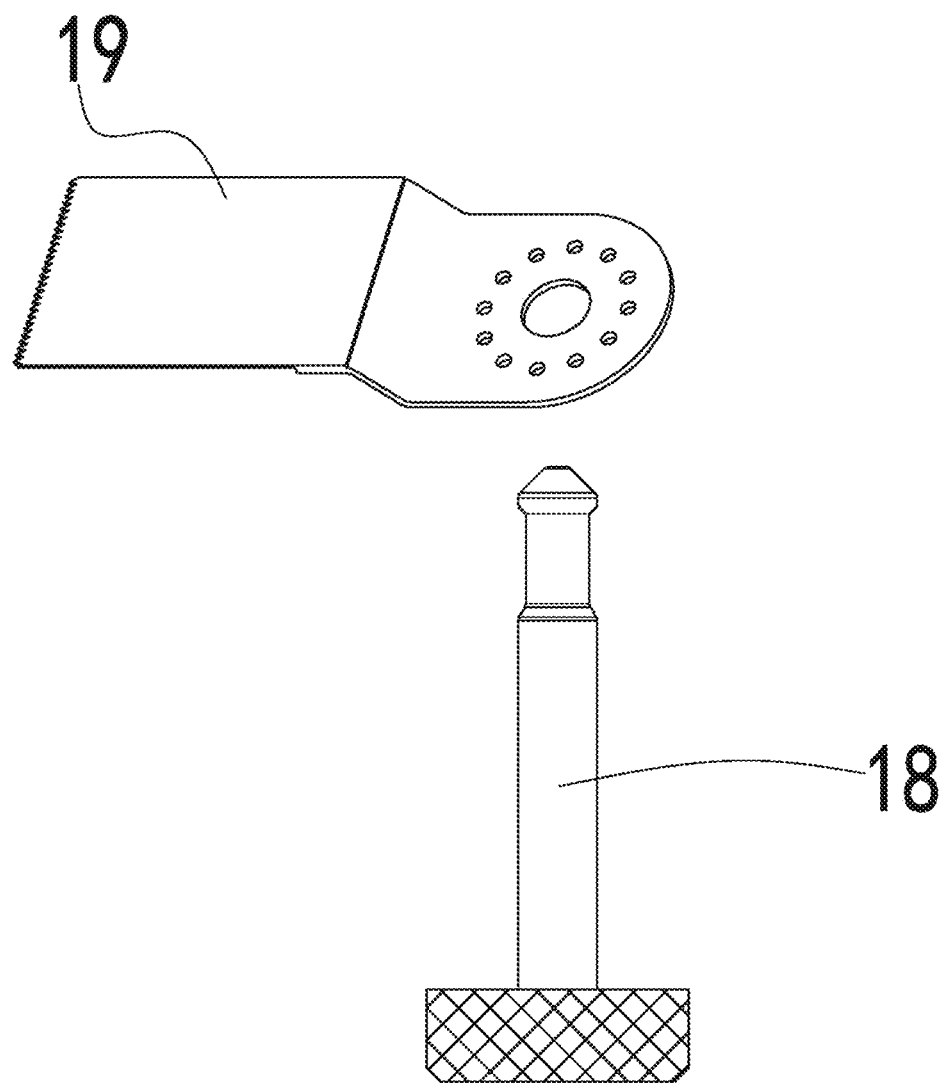
FIG. 4 is a structural diagram of the saw blade and the locking rod.

S2: the saw blade disposed around the locking rod 18 is detached and is replaced with a new saw blade, the saw blade and the locking rod are as shown in FIG. 4;

After the locking rod 18 is taken out, the original saw blade disposed around the locking rod 18 is taken out synchronously and is then detached from the locking rod 18, and the new saw blade is disposed around the locking rod 18.

S3: the locking rod 18 is installed in the head shell 5, and the quick-change buckle is rotated to fasten the saw blade through the locking mechanism;

The locking rod 18 sleeved with the new saw blade is inserted into the hole of the tool rest 16 until the locking head 182 of the locking rod 18 is clamped into the collet chuck 12, such that the locking rod 18 is fixed preliminarily; then, the quick-change trigger snap 1 with the large-diameter portion of the eccentric block 2 abutting against the movable rod 11 is rotated to the initial state in which the small-diameter portion of the eccentric block 2 abuts against the movable rod 11; at this moment, the cylindrical spring 14 is released to allow the locking block 13 to move upwards to drive the collet chuck 12 to move upwards, which in turn drives the locking head 182 to move upwards to enable the rod head 183 press the saw blade 19 on the tool rest 16; at this moment, the locking rod moves upwards to the maximum extent and will no longer move upwards, the circular inclined slope 131 on the inner side of the locking block 13, which is still subjected to an upward force from the cylindrical spring 14, presses the outer side of the clamping portion of the collet chuck 12 to enable the collet chuck 12 to contract inwards to fasten the locking rod 18, and quick change of the saw blade 19 is completed.

In this embodiment, the saw blade may be replaced with a shovel blade, a grinding wheel, or the like.

In this embodiment, the saw blade is pressed on the tool rest to be fixed through the rod head on the lower portion of the locking rod, the diameter of the rod head is greater than that of the inner hole of most saw blades on the market, and the diameter of the locking rod is less than that of the inner hole of most saw blades on the market, such that the saw blade quick-change structure and method have good adaptability and can be used for installing most saw blades on the market, and special saw blades are not needed.

The present invention is explained in detail above in conjunction with embodiments, but the above embodiments are merely preferred ones of the invention, and should not be construed as limiting the implementation scope of the invention. All variations and improvements made within the scope of the present invention application should fall within the patent scope of the invention.

The invention claimed is:

1. A saw blade quick-change structure for electric tools, comprising a locking mechanism, a head shell, a tool rest and a quick-change buckle, the locking mechanism being installed in the head shell and used for fixing or releasing a saw blade, the tool rest being installed at a bottom of the head shell, the quick-change buckle being hinged to the head shell and used for controlling the locking mechanism to lock or release the saw blade, wherein the locking mechanism comprises a movable rod, a locking rod, a collet chuck, a locking block, a stop collar and a return spring; a cross-section of the movable rod is in an inverted Y shape, a cavity for receiving the collet chuck is formed in a lower portion of the movable rod, an upper portion of the collet chuck is located in the cavity, a clamping portion of the collet chuck faces downwards, an inner diameter of a lower portion of the cavity increases gradually from top to bottom, an upper surface of the collet chuck does not contact a top surface of the cavity, a locking head is disposed above the locking rod, a maximum diameter of the locking head is greater than a diameter of the locking rod below the locking head, and the locking head is located in the clamping portion of the collet chuck and is in contact with the clamping portion of the collet chuck; the locking block is located below the movable rod, a through hole is formed in a middle of the locking block, the locking block has an upper portion with a large inner diameter and a lower portion with a small inner diameter, an inclined slope is formed between the upper portion with the large inner diameter and the lower portion with the small inner diameter of the locking block, an outer side of the clamping portion of the collet chuck is in close contact with the inclined slope, and a central axis of the locking block is coaxial with a central axis of the movable rod; the stop collar is disposed around the locking rod, a position of an upper end of the stop collar corresponds to a position of a lower end of the clamping portion of the collet chuck in an up-down direction; and the return spring is in contact with the locking block and is used for returning the locking block.

2. The saw blade quick-change structure for electric tools according to claim 1, wherein the return spring is a cylindrical spring, the outer diameter of the upper part of the locking block is larger than the outer diameter of the lower part, and the cylindrical spring is sleeved on the locking block and around the lower part of the block, and the top of the cylindrical spring abuts against the bottom surface of the upper part of the locking block, and the lower end of the cylindrical spring is fixed in the head shell.

3. The saw blade quick-change structure for electric tools according to claim 1, wherein the quick-change buckle comprises a quick-change trigger snap and an eccentric block, the quick-change trigger snap and the eccentric block are fixedly installed, and the eccentric block is hinged to the head shell and has a large-diameter portion and a small-diameter portion, as well as the small-diameter portion or the large-diameter portion in contact with an upper surface of the movable rod.

4. The saw blade quick-change structure for electric tools according to claim 1, further comprising an output shaft and a shift fork, wherein the output shaft is a hollow stepped shaft, the locking mechanism is installed inside the output shaft, the output shaft is rotatably installed in the head shell, the output shaft and the head shell are connected through a bearing, and the tool rest is fixedly installed at a lower end of the output shaft; and the shift fork is disposed around the output shaft.

5. The saw blade quick-change structure for electric tools according to claim 4, wherein the locking rod comprises a rod body and a rod head, the locking head is located at a top end of the rod body, and the rod head is matched with the tool rest to fix the saw blade.

6. The saw blade quick-change structure for electric tools according to claim 5, wherein the locking rod penetrates through the tool rest, a hole or protrusion matched with the saw blade is disposed on a lower surface of the tool rest, the saw blade is disposed around the locking rod and is located between the tool rest and the rod head, and an upper surface of the rod head is in close contact with a lower surface of the saw blade.

7. The saw blade quick-change structure for electric tools according to claim 4, wherein a deep groove ball bearing is disposed on an upper portion of the output shaft, and a needle bearing is disposed on a lower portion of the output shaft; and a first clamp spring is disposed on an upper portion of the deep groove ball bearing, and a second clamp spring is disposed on a lower portion of the deep groove ball bearing.

8. The saw blade quick-change structure for electric tools according to claim 1, wherein an inner diameter of a lower portion of the cavity in the lower end of the movable rod is the same as that of a hole in an upper portion of the locking rod.

9. A saw blade quick-change method using the saw blade quick-change structure for electric tools according to claim 1, comprising:
    S1: rotating the quick-change buckle to move the movable rod downward and press the locking block, so that the locking block moving downward to drive the collet chuck to move downward, then the collet chuck touching the limit sleeve and stopping moving downward, the movable rod and the locking block continuing to move down so that a clamping part of the collet chuck being located in a cavity formed by a lower part of the movable rod and an upper part of the locking block, and pulling the locking rod out from the head shell, and the clamping part of the collet chuck being elastically stretched out or expanded to release the locking head and then reset;
    S2: detaching the saw blade disposed around the locking rod, and replacing the saw blade with a new saw blade; and
    S3: inserting the locking rod in the head shell, the locking head entering the clamping part of the collet chuck, rotating the quick-change buckle, the return spring restoring the locking block, and the locking block moving upward so that a slope in the locking block compressing inwardly the clamping part of the collet chuck to make the collet chuck hug the locking head and fix the locking rod, so as to complete the quick change installation of the saw blade.

10. The saw blade quick-change method according to claim 9, wherein:
    the step S1 specifically comprises: with the cylindrical pin as a rotation center, driving, by the quick-change trigger snap, the eccentric block with the small-diameter portion abutting against the movable rod to rotate by 180° to enable the large-diameter portion of the eccentric block to abut against the movable rod; and pressing the movable rod downwards to drive the collet chuck and the locking block to move downwards until the lower end of the collet chuck contacts the upper end of the stop collar, such that the collet chuck stops moving downwards, the locking block continues to move downwards under the action of the movable rod until the collet chuck is located at a center of an internal space defined by the movable rod and the locking block, at this moment, the collet chuck is in a free state, and the locking rod is taken out;
    the step S2 specifically comprises: taking out the locking rod sleeved with the original saw blade, detaching the saw blade from the locking rod, and disposing the new saw blade around the locking rod;
    the step S3 specifically comprises: inserting the locking rod sleeved with the new saw blade inserted into the hole of the tool rest until the locking head of the locking rod is clamped into the collet chuck, such that the locking rod is fixed preliminarily; then, rotating the quick-change trigger snap with the large-diameter portion abutting against the movable rod to an initial state in which the small-diameter portion of the quick-change trigger snap abuts against the movable rod; and at this moment, releasing the cylindrical spring is released to allow the locking block to move upwards to drive the collet chuck to move upwards, which in turn drives the locking head to move upwards to enable the rod head press the saw blade on the tool rest, such that the locking rod moves upwards to the maximum extent and will no longer move upwards, the inclined slope on the inner side of the locking block, which is still subjected to an upward force from the cylindrical spring, presses the outer side of the clamping portion of the collet chuck to enable the collet chuck to contract inwards to fasten the locking rod, and quick change of the saw blade is completed.

\* \* \* \* \*